Figure 1:
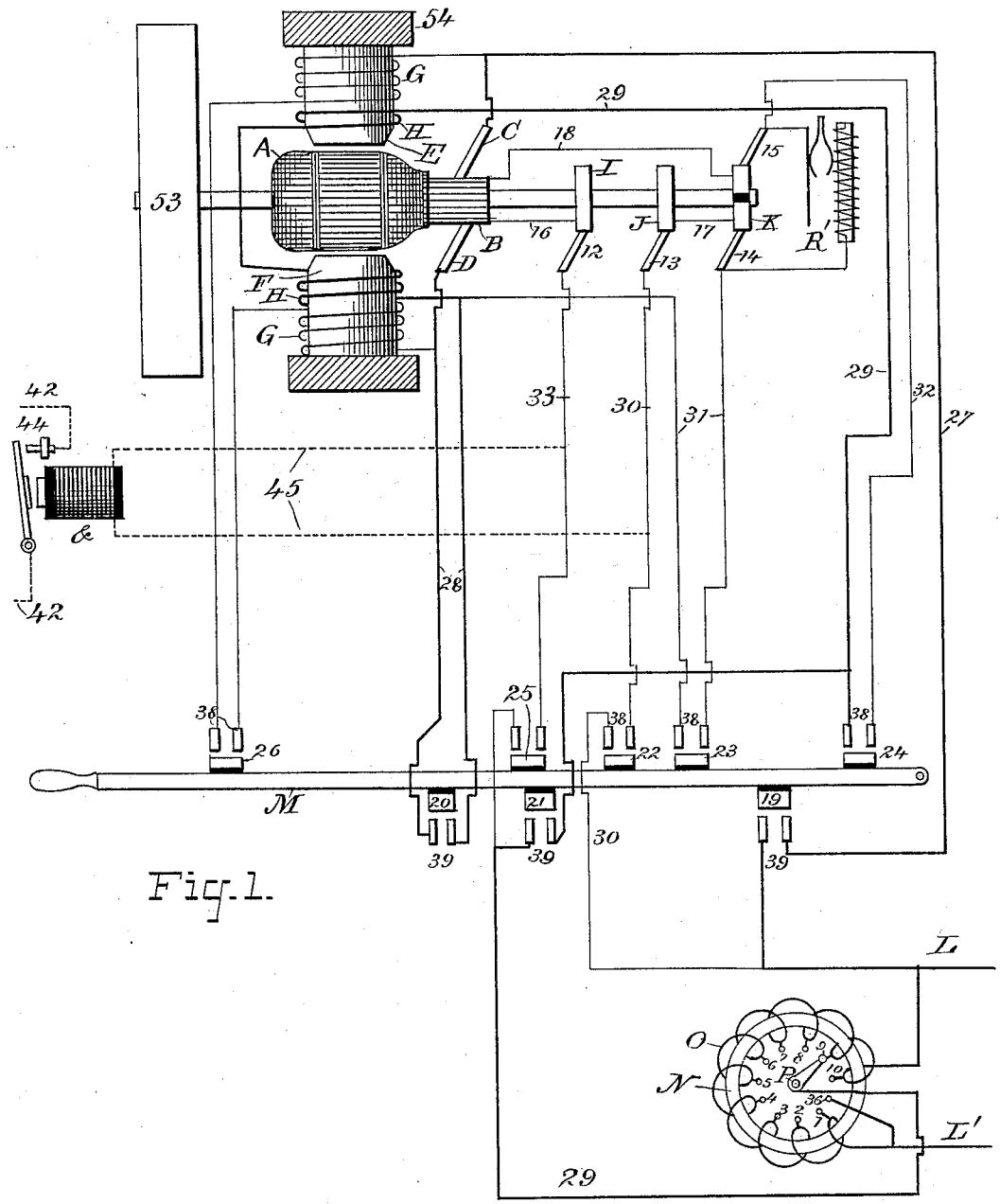

(No Model.)  6 Sheets—Sheet 2.

A. J. CHURCHWARD.
ALTERNATING CURRENT MOTOR.

No. 593,716. Patented Nov. 16, 1897.

WITNESSES  
INVENTOR  
A. J. Churchward (No Model.) 6 Sheets—Sheet 3

A. J. CHURCHWARD.
ALTERNATING CURRENT MOTOR.

No. 593,716. Patented Nov. 16, 1897.

WITNESSES

INVENTOR
A. J. Churchward (No Model.) 6 Sheets—Sheet 4.
A. J. CHURCHWARD.
ALTERNATING CURRENT MOTOR.
No. 593,716. Patented Nov. 16, 1897.
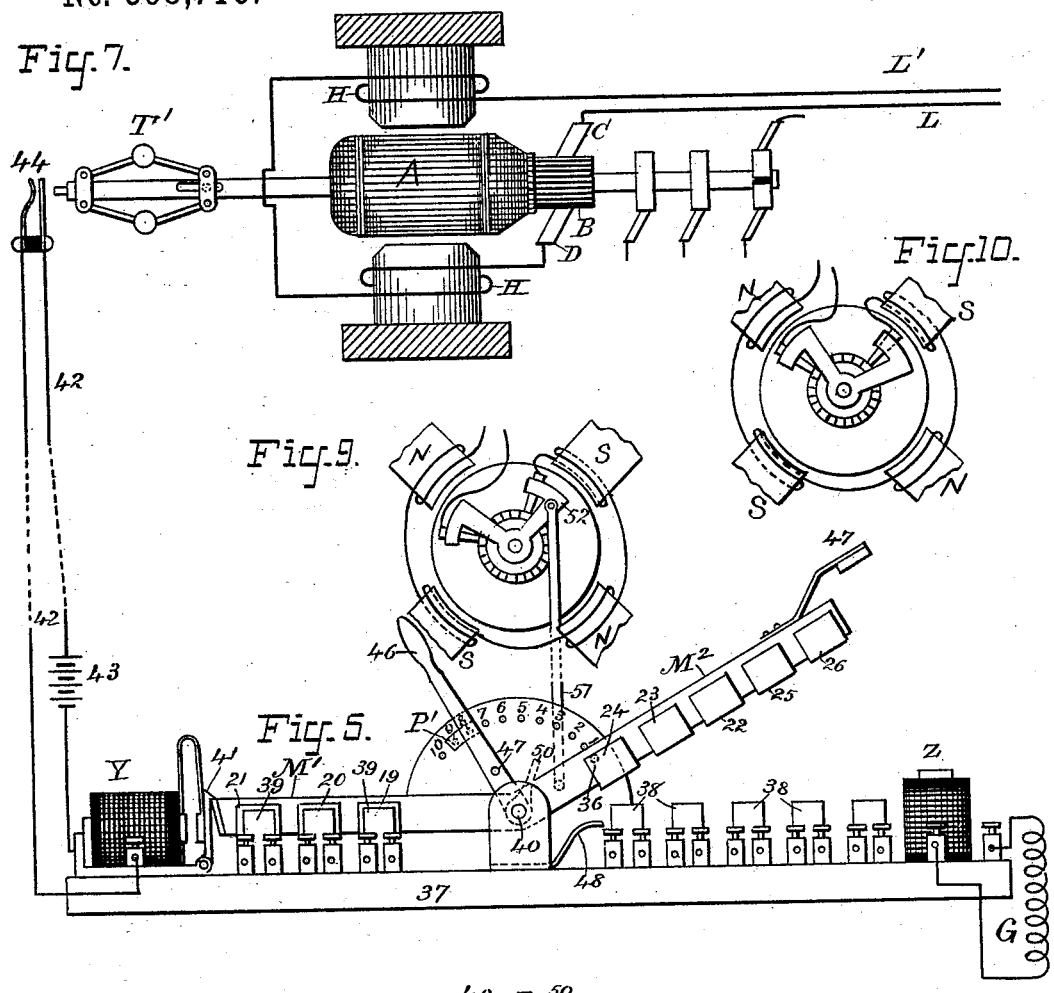
WITNESSES
H. H. Capel
D. H. Dicker
INVENTOR
A. J. Churchward

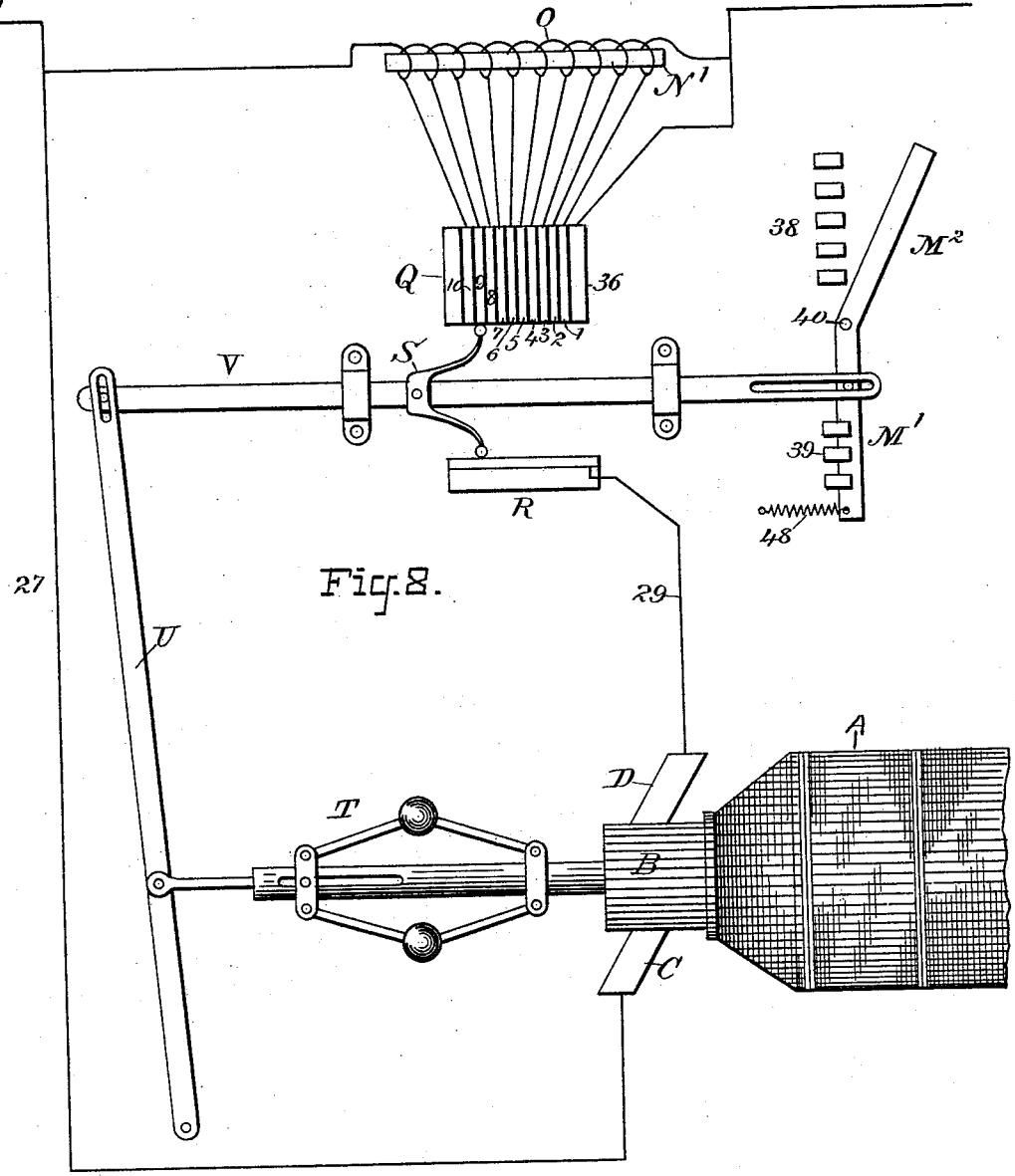

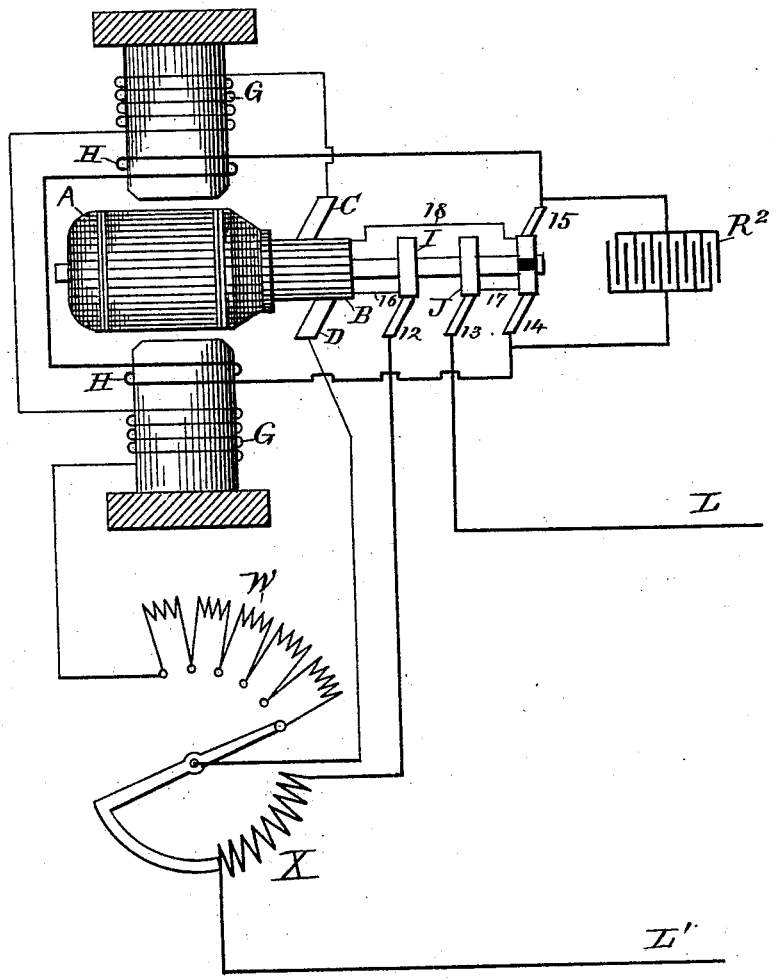

UNITED STATES PATENT OFFICE.

ALEXANDER JAMES CHURCHWARD, OF BROOKLYN, NEW YORK.

ALTERNATING-CURRENT MOTOR.

SPECIFICATION forming part of Letters Patent No. 593,716, dated November 16, 1897.

Application filed July 1, 1896. Serial No. 597,688. (No model.)

*To all whom it may concern:*

Be it known that I, ALEXANDER JAMES CHURCHWARD, a citizen of the United States, and a resident of Brooklyn, in the county of Kings and State of New York, have invented a certain new and useful Alternating-Current Motor, of which the following is a specification.

My invention relates to a novel, simple, and effective alternating-current motor designed to combine in one machine or mechanism the principle of an alternating-current synchronous motor with that of the ordinary direct-current motor or generator used for non-synchronous or starting purposes.

Some of the features of my invention relate especially to motors run from constant-potential circuits.

It has heretofore been proposed to combine two separate motors—one synchronous, the other non-synchronous or starting. It has also been proposed to furnish a motor with two separate sets of windings, field and armature, for the same purpose. It has further been proposed to use the ordinary direct-current motor or generator both as as a synchronous and non-synchronous alternating motor; but so far as I am aware the plans heretofore proposed for this purpose involved the working of the field-coil in shunt to the armature under one or both conditions of working, or else the use of commutator in the circuit of the field and armature operating at the synchronous speed to rectify the alternating current supplied to field and armature, so as to operate the motor in effect as a continuous-current motor.

One of the important features of my invention is that the series field of the motor used in non-synchronous working is by proper switch-rectifying commutator and connections used also as a series field in synchronous working, alternating currents being at such time fed to the armature.

Another feature of the invention is that in combination with such series field in synchronous working a shunt or constant field excitation may be had from the alternating-current portion of the circuit. I do not limit myself, however, to such method of obtaining the constant field excitation in combination with the series field, as it may be obtained in other ways.

My invention also consists, broadly, in a single-phase alternating-current motor constructed in any desired way to be self-starting, but organized when running as a synchronous motor to have its field excited by two coils, one of which provides a constant field excitation, while the other carries current increasing with the load and obtained from a commutator located between armature and field, so as to cause the alternating current supplied to the motor and flowing in coils of the armature as an alternating current to flow through the field as a continuous current.

My invention relates also to means for controlling the action of a switch for throwing the motor into and out of non-synchronous working condition and to arrangement of circuits and devices, together with other features of invention more particularly hereinafter described and then specified in the claims.

Figure 2:
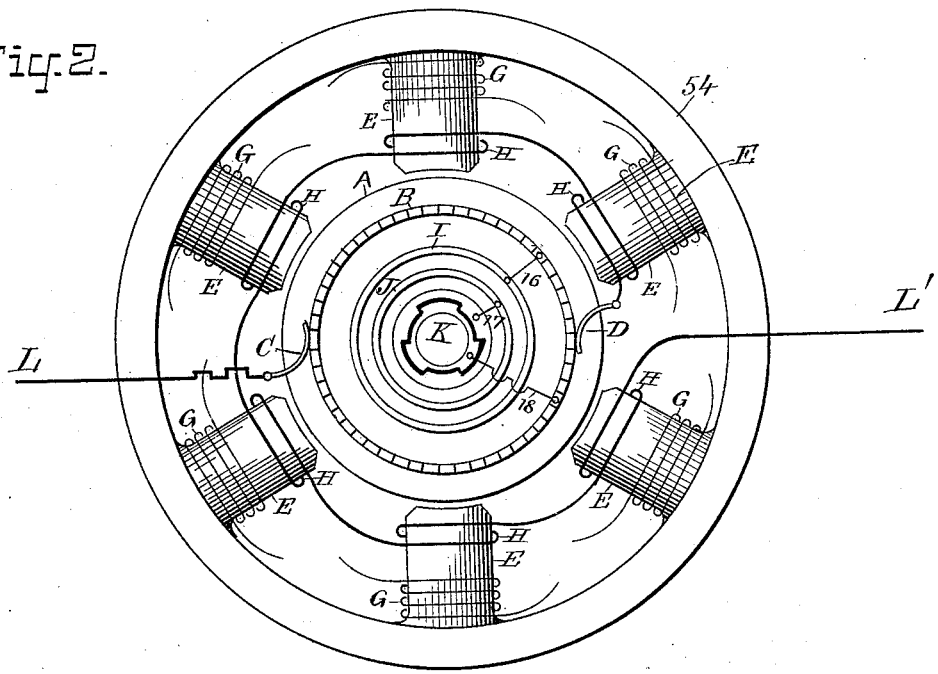
Figure 3:
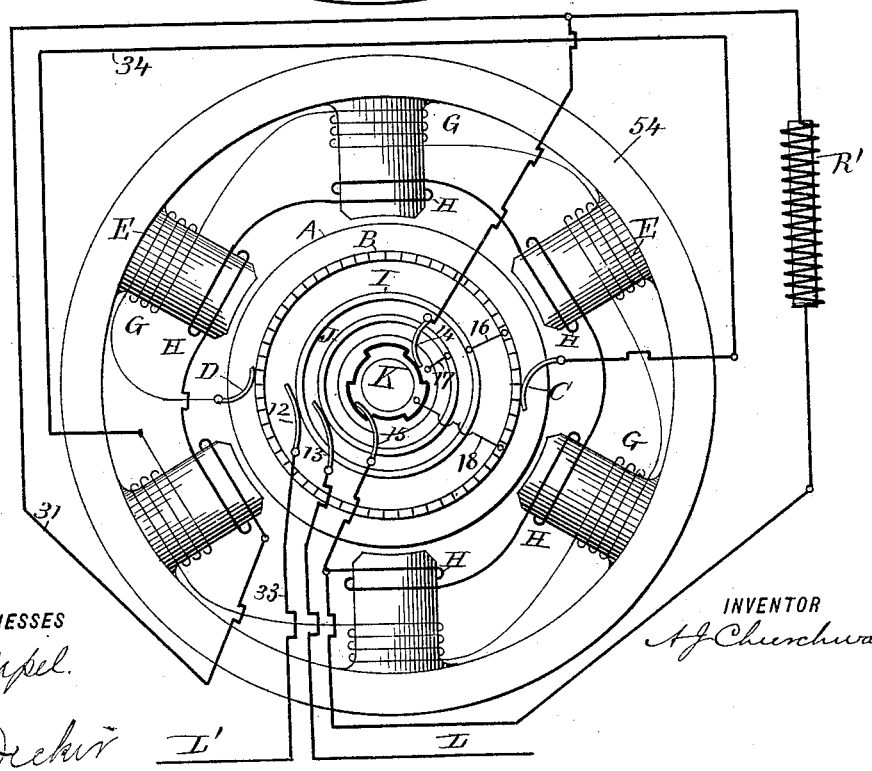
Figure 4:
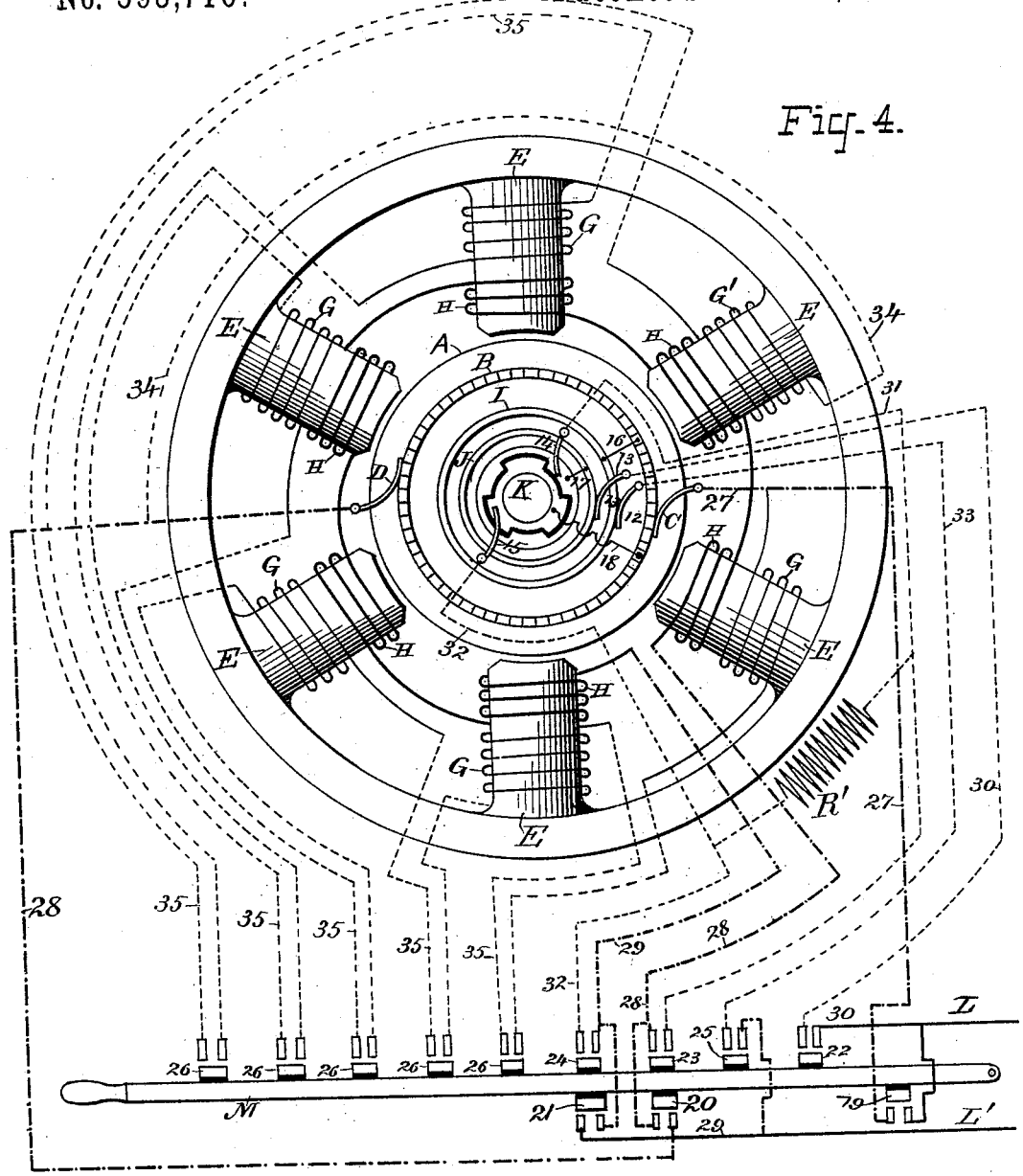

In the accompanying drawings, which form a part of the specification, Figure 1 diagrammatically represents my invention in its simplest application. Figs. 2 and 3 represent its application to a multipolar motor, showing, respectively, the connections for non-synchronous and synchronous running. Fig. 4 is a like representation of a multipolar machine, showing all the windings and their connections to the controlling-switch. Figs. 5 and 6 represent, respectively, a side elevation and plan of one form of controlling-switch. Fig. 7 represents one mode for releasing the controlling-switch to allow it to be thrown from the position of non-synchronous working into that for synchronous working, also the starting or non-synchronous circuits in a two-pole machine. Fig. 8 represents a controlling-switch automatically operated. Figs. 9 and 10 diagrammatically represent, respectively, the positions of the main commutator-brushes in starting and in synchronous working. Fig. 11 represents in a bipolar machine the circuits for synchronous running and a means for regulating the field of the machine.

With special reference to Figs. 1, 7, and 11, A indicates the armature, which may have any of the ordinary windings of a direct-current motor or generator and the usual form of commutator, as at B, the brushes therefor being indicated at C and D. The field-poles are represented at E and F and are, as to their free ends, of a form shown and claimed in an application for United States patent filed by me September 12, 1896, under Serial No. 605,593. Upon each of these poles is wound what for the sake of description will be termed the "shunt" G, since in the preferred form of construction in synchronous operation the constant field excitation is produced by this shunt across the brushes C and D, though it may be produced in various other ways. In addition to the coils of the shunt-circuit there is also wound upon said poles the coils of what will be termed the "series" circuit, which is in series with the armature both in starting and in synchronous working. The machine for synchronous working is further equipped by mounting the rings I and J and the current-correcting commutator K upon the armature-shaft, which are provided, respectively, with brushes 12 13 14 15. The ring 12 is connected by conductor 16 to armature A, the ring 13 by conductor 17 to one side of commutator K, while the other side of said commutator is connected by conductor 18 to the armature. The remainder of the circuits will best be described by tracing the current over them. The non synchronous or starting circuit is separately outlined in Fig. 7 and leads from the main L to the brush C through the armature to brush D, thence through coils H of the field-magnets and to the main L'. The circuits for synchronous running are separately shown in Fig. 11. The principal circuit leads from the main L to ring J, thence to commutator K, and from brush 14, through series coils H, to brush 15, and from commutator K, by conductor 18, to and through armature A to ring I, and thence to the main L'. The shunt-circuit extends from brush D through coils G and to brush C. In order to direct the current through these circuits, a switch is provided which in one position places the circuits in starting condition and in the other places them in synchronous working condition. Such a switch is simply graphically outlined in Fig. 1, wherein a bar M is shown provided with insulated contact-plates 19, 20, and 21 for closing the starting-circuit and with similar plates 22, 23, 24, 25, and 26 for closing the synchronous circuits upon the opening of the starting-circuits. These plates engage with the pairs of contacts adjacent thereto.

In starting the machine the lever M is in the depressed position, and the starting-circuit from main L, as above outlined, is completed at contact 19 through the armature over conductor 27, then at contact 20 over conductor 28 through series coil H, and at contact 21 over conductor 29 to the main L'. Then when the machine has reached or slightly passed synchronous speed lever M is raised, breaking connection at contacts 19, 20, and 21 and making them at contacts 22, 23, 24, 25, and 26, thereby completing the synchronous circuits from the main L at 22 over conductors 30 and 17 and ring J and commutator K, then at contact 23 over conductor 31 through series coil H, then at contact 24 over conductor 29 and 32, commutator K, and conductor 18 to and through the armature and ring I, and then at contact 25 to the main L' over conductors 33 and 29, the break in the shunt-coil G being closed at contact 26.

In the six-pole machine graphically represented in Figs. 2, 3, and 4 the circuits above described are employed and controlled in substantially the same manner as in the two-pole machine and the parts bear the same reference-characters. The field-poles are represented at E, bearing the coils G and H. The circle just within them represents the armature A, within which are the commutator B, the rings I and J, and the current-rectifying commutator K, the connections 16, 17, and 18 between these parts appearing as indicated, while the various brushes engage their respective parts. In Fig. 2 only the starting-circuit is indicated intact. It extends from main L through armature A, thence by brush D to and through coils H and to main L', the coils G of the shunt-circuit being shown broken from one another. In Fig. 3 the synchronous circuits are shown alone, the shunt-circuit starting from D, extending through coils G and by conductor 34 to brush C, while the series circuit starting from main L extends to brush 13, ring J, thence by 17 to brush 14 on commutator K, thence over 31 to and through coils H to brush 15 on commutator K, thence by 18 to and through armature A and by 16 to ring I and off brush 12 by 33 to main L'. In Fig. 4 the entire wiring of a six-pole machine and the switch controlling it are indicated in like manner to that shown in Fig. 1. The lever M, however, carries a series of contacts 26 sufficient to break the shunt-circuit between the adjacent coils G thereof, circuits 35 leading from said coils to terminals in the paths of contacts 26. By thus providing a break in the connection between the respective coils G while the motor is starting the high electromotive force due to transformer action is reduced to a minimum. The starting-circuit in this diagram is from L, through contact 19, conductor 27, brush C, armature A, brush D, conductor 28, and contact 20 through coils H and conductor 29 and contact 21, to main L', the synchronous circuit being broken at all contacts above lever M. In synchronous running the series circuit is from L, over conductor 30 and contact 22, to brush 13, over ring J, conductor 17, brush 14 of commutator K, conductor 31, contact 23, conductor 28, through coils H, over conductor 29, contact 24, conductor 32, brush 15 of commutator K, conductor 18, armature A, conductor 16, ring I, brush 12, conductor 33 and contact 25 to main L'. The shunt-circuit is from brush D, over conductor 34, to coil G', thence to and through the successive coils G and the intervening conductors 35 and contacts 26 to conductor 27 and brush C.

From the description thus far given it will be seen that in starting the winding comprised in coils H, which, as indicated, is of a heavier conductor than that of the shunt-winding, is in series with the single winding of the armature, Fig. 7, and when connected for synchronous running, Fig. 11, the said winding is in series with the armature through the rectifying-commutator K. The commutator therefore changes the alternating current of the mains into direct current for the field-coils H and provides for regulating the strength of the field-magnets in proportion to the load. The shunt-winding comprised in coils G also carries a direct current rectified from the alternating current and collected from commutator B. This shunt-winding is especially useful at light and variable loads, and may, if desired, be cut out at other times, for which purpose the contact 26 would be carried by a lever independent of lever M, as in an ordinary jack-knife switch, though for general use this winding is employed and controlled along with the series winding, as illustrated. The shunt-winding may be entirely omitted when the motor is to operate under a constant load, as in driving a blower, elevator, crane, or like mechanism.

It is well known that each alternation of an alternating current varies in potential, so that when rectified the continuous current produced will be of a wavy character instead of perfectly smooth or unvarying. In order to smooth said current, as well as to neutralize any effort of the field to surge and of the motor to pump and upset the circuit from which the motor is supplied, I employ a self-inductive shunt of any desired character adapted to absorb the varying energy and give it out again to the circuit of the field-coil, and thereby act to equalize the varying current. This self-inductive shunt may be, as indicated, a reactive coil, which is by preference made adjustable, but any other devices known in the art as having the same function in the relation described might be employed as the self-inductive shunt—as, for instance, a condenser, as shown in Fig. 11.

Alternating-current motors as heretofore constructed require an enormous amount of current to start them. I have devised a means by which this defect is remedied and which enables my motor to be started on only a slight increase of the normal running-current. Such means is illustrated in Figs. 1 and 8 and may be termed an "economy-coil." The economy-coil or autoconverter, as shown in Fig. 1, consists of a circular core N, constituting a magnetic circuit and a winding upon the same, of a series of sections or coils O. This series of coils is connected at one end with the main L and at the other end with the main L', thereby forming a shunt across the main circuit. To each coil, however, is connected a contact, and to the conductor 29, which forms a continuation of the main L', is connected a switch-arm P, which travels over said contacts and throws more or less of the coils O into the circuit of the motor, as required.

In operation, supposing the normal current to the motor to be of ten amperes and arm P to be on the contact of the ninth coil, as indicated, the current will flow from L through the motor to P, then through nine-tenths of the winding and out at L', thereby generating between P and L ten times the normal current at one-tenth of the voltage. This will start the motor and at the same time reduce the voltage and cut down sparking at the commutator. Then as the motor gains speed the arm P is moved around toward L' until the motor is in synchronism, when the economy-coil is completely cut out of the motor-circuit by arm P resting upon contact 36.

As shown in Fig. 8, the economy-coil may consist of a straight bar N', surrounded by coils O, which are separately connected to a series of contact-bars, as at Q, between which and a plate R moves a sliding contact S, the plate R being diagrammatically represented as connected by conductors 29 and 27 through the motor to the main L. In this figure also said coil is shown as automatically operated by the rotation of armature A, as through the agency of an ordinary ball-governor T, connected to lever U, which reciprocates rod V and moves sliding contact S to successively cut out the coils O as the armature increases in speed up to synchronous running, when said sliding contact will make direct connection with L' through contact 36. This coil may be automatically controlled in various other ways and also manually controlled, as in the form shown in Fig. 1. When necessary, I also regulate the strength of the field in proportion to the load through suitable current-regulating means in or acting upon the shunt-winding. One means for this purpose is indicated in Fig. 11, which consists of a rheostat having its series of coils W located in the circuit of the shunt-winding and the controlling magnet or solenoid X located in series in the main L'. This regulation of the motor by adjusting current in coils, such as K, in circuit independent of the armature, so as to increase with the load, is not claimed herein, but in a separate application filed by me March 29, 1897, Serial No. 629,850.

It is desirable in a machine of this sort that the arrival thereof at synchronism shall be insured before the connections can be shifted from the non-synchronous to the synchronous condition. This may be accomplished in many ways, one especial construction for which is illustrated in Figs. 4 and 5, wherein 37 represents a base of insulation, on which are mounted the terminal contacts 38, Fig. 1, in the synchronous circuits and the terminal contacts 39 in the starting-circuits. These contacts are arranged in pairs, as shown, and spaced apart, so as to receive between them the contacts 19 21 and 22 26, respectively, which in this form of switch are mounted on the arms M' and M² of an elbow-lever fulcrumed at its bend by means of the shaft 40, journaled in suitable bearings mounted upon the base 37. Upon one end of the base is a magnet Y, which upon being suitably energized acts to withdraw a catch 41 from the end of lever-arm M', said catch acting during the starting operation of the motor to hold said arm down, thereby completing the starting-circuit through contacts 19 21 between terminals 39. The energization of this magnet may be accomplished in many ways and timed to take place at that instant when the motor has just passed synchronism. One of these ways is shown in Figs. 5 and 7, wherein the magnet is shown in a circuit 42, supplied with current from any suitable source, typified at 43, and the circuit is closed by means of a governor T', mounted upon the armature-shaft and so adjusted that as the armature reaches synchronous speed the contacts 44 will be closed, the magnet Y energized, and the catch 41 withdrawn from arm M'. The circuit of magnet Y may be controlled by a relay operating upon increase in voltage, if desired. Such a relay is shown at & in Fig. 1, connected by dotted lines 45 to branches 30 and 33 of the synchronous circuit and acting to close contacts 44' in circuit 42 of magnet Y. This relay is of high resistance and is in reality in shunt across the mains when the motor is running in synchronism. When the motor is starting, however, the relay is in circuit through the armature via 33 12 16 18, the self-induction coil R', and commutator K, 17, 13, and 30, so that the sudden rise in voltage, which occurs just as the point of synchronism is passed, will energize magnet &, close contacts 42, energize magnet Y, and release arm M' of the controlling-lever. This sudden rise in voltage is due to the fact that the magnet & being of high resistance and the current through the armature during non-synchronous running being an alternating current the current in the circuit just described does not strongly affect the magnet prior to the point of synchronous running, but as soon as that point is passed the sudden flow of direct current through the armature, rectified from the alternating current by the commutator, operates the relay. The release of catch 41 is a signal to the attendant to throw arm M² down to engage contacts 22 26 with terminals 38. This he may do by means of a lever 46, which is idle upon shaft 40 and carries a projection 47 for engagement with the arms M' and M², a sufficient lost motion being allowed thereto to enable it to perform other work in transit from one extreme position to the other. As this lever is thrown over the elevation of arm M' breaks the starting-contacts and the depression of arm M² closes the synchronizing-contacts. Upon the closure of the latter contacts the lever is held in the depressed position by means of the magnet Z, which is connected to or governed by the circuit G in any way, so as to operate or be brought into operation by the current flowing when the circuit of G is closed. This magnet in holding the lever depressed does so simply by magnetic attraction upon an armature 47, carried by the arm M². It also holds said arm against the force of a spring, as 48, which upon the weakening of magnet Z, due to the motor getting out of step, throws up arm M² and breaks the synchronous circuit. Then the attendant throws the lever 46 over and causes M' to close the starting-circuits. This operation of the controlling-lever may be automatic, if desired, as will be hereinafter described.

In the synchronous running so long as the motor is in step a direct current flows through the shunt-winding of the field-magnets and the magnet Z; but if the circuit is interrupted long enough for the motor to get out of step, or if it is overloaded, then it ceases to deliver a direct current to magnet Z, causing it to be deënergized and to release arm M², thereby opening the main circuit and protecting the motor from any possibility of burning out.

The release of the controlling-lever both by catch 41 and magnet Z may, if desired, be signaled in any suitable way, as by said catch striking a bell or by the armature 47 striking a bell. The arm M² may obviously also be held down by a catch and released in substantially the same way as arm M'.

The switch just described may be utilized to control such adjuncts of the motor as the economy-coil N O. For this purpose I mount upon a suitable support, as 49, the contacts 1 to 10 and 36 of said coil and attach to the lever 46 a suitable brush P' for engaging therewith. By this means while M' is held down 46 may be moved to cut out section after section of the economy-coil, and when it has depressed M² be in position such that P' shall rest upon contact 36 and so cut said coil entirely out of circuit with the motor. This lever 46 may also operate to change the brushes C and D from the position for non-synchronous running (indicated in Fig. 9) to that of synchronous running. (Indicated in Fig. 10.) This may be done in any suitable way—for example, by means of an arm 50, carried by shaft 40 and moving with lever 46, with such lost motion between it and a projection on the lower end of link 51 that as the arm M² closes the synchronous contacts arm 50 will engage with said projection on link or rod 51 and effect the desired shifting of the brushes. This link or rod, Figs. 5 and 9, is pivoted to the brushes and depends so as to place the projection thereon (indicated by the dotted lines) in the path of arm 50. This shifting of the brushes is of great advantage in obtaining the full efficiency of the machine, since when the brushes are adjusted for sparkless commutation in synchronous running they will not in starting give the greatest amount of torque. I have found that placing the brushes substantially in the relative position to the field-poles (seen in Fig. 9) the greatest starting torque is obtained, and that to produce sparkless commutation when the machine is brought into synchronism the brushes must stand in substantially the position indicated in Fig. 10. The mechanism above described will accomplish this shifting, though any other desirable means may be employed.

The method of reducing the self-induction in the armature-circuit of a self-starting alternating-current dynamo during the starting operation and increasing the starting torque by thus adjusting the commutator-brushes is not herein claimed, as it forms the subject of claims in an application for patent filed by me March 29, 1897, Serial No. 629,853.

The operation of the economy-coil may, as above described, be made automatic, so, also, may the entire operation of the controlling-switch. The effect of the adjustment of the commutating devices is to change the "lead" of the brushes. As well understood in the art, the effect is produced by shifting either element—to wit, either the commutator-brushes or the commutator-cylinder. While, therefore, I have shown one way of adjustment, I do not wish to be understood as excluding myself from the use of the other. One way of accomplishing this is seen in Fig. 8, wherein said switch is simply outlined at 38 39 M' M². To the arm M' is connected the rod V, as by pin and slot indicated, which are so proportioned that as the motor reaches the speed at which the synchronous circuits should be completed the end of the slot engages with the pin and shifts the switch. In the position of rest the switch stands as indicated, the spring 48' insuring the closure of the starting-circuits. Then when the usual line-switch is thrown, putting current to the motor, the armature gradually starts into rotation, the governor, which may be of any form desired, moves rod V, causing S to gradually cut out the sections of the economy-coil, and just as it completes that work to strike the pin on arm M' and throw the controlling-switch over, so that M² will complete the synchronous circuit or circuits. Should the motor drop out of step for any reason, the switch will be returned to the starting position by spring 48'.

In an alternating single-phase motor the energy supplied is not of a constant character. It is a succession of impulses. Therefore to produce perfectly smooth running it is advisable to use a balance or fly wheel, which is preferably mounted upon the armature-shaft, as indicated at 53 in Fig. 1. This fly-wheel acts as a regulator by storing energy at certain points in the current-wave and returning the same at certain other points.

The contacts 38 and 39, though preferably of the rubbing sort, may be of any other form. The self-induction coil across the brushes of commutator K may also be replaced by a condenser, as indicated at $R^2$ in Fig. 11, as the condenser would operate in the same manner as the coil in conjunction with the rectifying-commutator. Obviously these and many other changes are within my invention, which, as understood, is herein illustrated for the greater part simply diagrammatically.

What I claim as my invention is—

1. In an alternating-current motor, the combination with the starting-winding and armature wound with any suitable direct-current generator or motor winding to adapt the machine for self-starting operations, of a rectifying commutator and switch, and connections whereby said winding may be included in series with the armature and carry a continuous or direct current for synchronous running while the armature carries an alternating current.

2. In an alternating-current motor, a compound field-magnet for synchronous operation excited in part by continuous current taken directly from a direct or continuous current winding of the armature adapted for self-starting and in part by current passing through the armature and rectified.

3. An alternating-current motor having the ordinary direct-current armature and commutator and series field-winding for non-synchronous operation or starting, in combination with a switch, a rectifying-commutator in circuit with said series winding between the same and the armature, and connections whereby the same armature-winding may be run in series with said field-winding for synchronous operation.

4. An alternating-current motor having a series field-coil and a distributed or direct-current armature-winding and commutator, in combination with a switch and rectifying-commutator, whereby the machine may be run as a non-synchronous machine for starting with field and armature circuits both alternating, and in series or as a synchronous motor with the same field and armature circuit in series, the armature alternating but the field of constant polarity.

5. The method of operating an electric motor upon an alternating circuit which consists in passing the current through the armature and field winding in series as an alternating current in both and afterward through the same armature-winding as an alternating current and through the field-winding in series therewith as a rectified current.

6. In a self-starting alternating-current motor, a direct-current exciting-coil for synchronous operation wound to increase in strength with the increase of load, in combination with means for placing said coil in series circuit with the armature and with a suitable rectifying-commutator between said armature and field when the machine attains synchronism.

7. A single-phase alternating-current motor wound with a series coil connected into series circuit with the armature during non-synchronous or starting condition and carrying an alternating current, in combination with means for placing it in series circuit with the armature during synchronous condition and rectifying the current so as to cause the current which flows in the armature-coils as an alternating current to flow through the field as a continuous current.

8. The combination with an alternating-current motor, of a hand-switch for changing the circuits from condition of starting or non-synchronous working to condition of synchronous working, and means for automatically releasing said switch when or about when the motor has reached synchronous speed.

9. The combination, substantially as described, in an alternating-current motor, of a switch for changing the circuits of the motor from starting condition to synchronous working condition, a catch normally holding said switch in starting position, and means responsive to an increase in speed of the motor to or near synchronous speed for releasing said switch.

10. The combination with the controlling-switch for throwing an alternating-current motor from non-synchronous or starting condition to synchronous working condition, of means for automatically throwing said switch away from position for synchronous working when the speed falls below the synchronous speed and opening the main circuit of the machine.

11. The combination with the controlling-switch which establishes the circuits for synchronous working condition in an alternating-current motor, of means for holding the switch normally closed and automatically releasing the same to open the circuit when the speed drops below synchronous speed and independent means for placing the motor in starting or non-synchronous working condition.

12. In an alternating-current motor, the combination of the field-coil, an alternating-current-supply main, and a rectifying-commutator for rectifying the alternating currents before they reach said coil, of a self-inductive shunt around said field-coil, as and for the purpose described.

13. In an alternating-current motor, the combination with starting and synchronous coils wound on poles of said motor, of means for disconnecting said synchronous coils from one another during non-synchronous or "starting" operation whereby the transformer effects are reduced.

14. A single-phase self-starting alternating-current motor having its field excited, when running as a synchronous motor, by two coils one of which provides a constant field excitation, while the other carries current increasing with the load and obtained from a commutator located, as described, between armature and field so as to cause the alternating current supplied to the motor and flowing in coils of the armature as an alternating current to flow through the field as a continuous current.

15. The combination with an alternating-current motor, of a switch for changing the circuits from non-synchronous or starting condition to synchronous working condition, and mechanism for adjusting the commutating devices simultaneously with the change of circuits by the switch.

16. The combination with an alternating-current motor, of a switch for changing the circuits from non-synchronous or starting condition to synchronous working condition, and mechanism having lost motion for adjusting the commutating devices, as and for the purpose described.

17. In an alternating-current motor, the combination with a starting-winding in series with an armature, the said armature being wound with any standard distributed or direct-current winding and connected to a commutator so that the machine will be self-exciting for starting, of a rectifying-commutator, and switch and connections whereby said winding may be included in series with the armature and carry a continuous current in proportion to the load when the motor is running in synchronism.

18. In a self-starting alternating-current motor, a compound field-magnet for synchronous operation excited in part by a continuous current taken directly from the starting-commutator, the winding on the armature being a distributed winding connected in the ordinary way to a commutator to adapt the motor for self-starting operation, and to supply current to excite the shunt or high-resistance fields when running in synchronism, and in part by current rectified by an auxiliary commutator and passing through the armature, said auxiliary commutator and a field-winding in series.

Signed at New York, in the county of New York and State of New York, this 29th day of June, A. D. 1896.

ALEXANDER JAMES CHURCHWARD.

Witnesses:
WM. H. CAPEL,
JOHN A. NEXSEN.